United States Patent [19]

Cerroni

[11] 4,174,075
[45] Nov. 13, 1979

[54] APPARATUS FOR PROCESSING WASTE MATERIAL CHIEFLY COMPOSED OF PAPER AND PLASTIC FILM

[76] Inventor: Manlio Cerroni, via Bruxelles 53, Rome, Italy

[21] Appl. No.: 850,807

[22] Filed: Nov. 11, 1977

Related U.S. Application Data

[63] Continuation-in-part of Ser. No. 674,156, Apr. 6, 1976, abandoned.

[30] Foreign Application Priority Data

Apr. 16, 1975 [IT] Italy ............................ 49142 A/75

[51] Int. Cl.² ............................................ B02C 13/06
[52] U.S. Cl. ................................ 241/189 R; 241/191; 209/4
[58] Field of Search ................... 241/189 R, 191, 195, 241/197, 14, 28, 24; 162/4; 209/3, 4, 136-139 R

[56] References Cited

U.S. PATENT DOCUMENTS

| | | | |
|---|---|---|---|
| 1,724,895 | 8/1929 | Beach | 241/195 X |
| 1,787,828 | 1/1931 | Levin | 241/191 |
| 2,490,564 | 12/1949 | Vincent | 241/191 X |
| 3,154,255 | 10/1964 | Schulman et al. | 241/14 |
| 3,773,613 | 11/1973 | Lee et al. | 241/28 X |
| 3,826,437 | 7/1974 | Warren et al. | 241/195 X |
| 3,890,220 | 6/1975 | Anderson | 209/3 |
| 3,946,950 | 3/1976 | Graf | 241/189 R X |

Primary Examiner—Ralph J. Hill
Attorney, Agent, or Firm—Toren, McGeady and Stanger

[57] ABSTRACT

A device for the treatment of waste materials composed chiefly of paper and plastic film is equipped with a stellate rotor rotatably mounted within a casing of the device at a location through which the waste materials are passed. The stellate rotor is equipped with a plurality of rigid arms having ends which engage portions of the side walls of the casing to enhance recovery and separation of the paper and plastic film. Because of the rigid structure of the arms of the rotor, the ends of the arms engaging the casing side wall move along a circular path having a fixed radius. The casing side wall engaged by the ends of the arms of the rotor includes a curved portion extending from a first end thereof spaced away from the circular path of the rotor ends to a second portion which is coincident with the circular path of the rotor ends. The direction of rotation of the rotor is such that the ends of the arms move from the first end of the curved portion to the second end thereby causing the waste materials to be moved through a generally narrowing gap maintained between the curved portion of the casing inner wall and the rotor ends extending from the first end of the curved portion toward the second end.

2 Claims, 2 Drawing Figures dd# APPARATUS FOR PROCESSING WASTE MATERIAL CHIEFLY COMPOSED OF PAPER AND PLASTIC FILM This application is a continuation-in-part of application Ser. No. 674,156 filed Apr. 6, 1976 now abandoned.

BACKGROUND OF THE INVENTION

The present invention is generally related to apparatus for treating waste materials and more particularly to apparatus especially suitable for treating urban solid wastes composed chiefly of paper and plastic film.

It is generally known that urban solid wastes are mostly composed of highly heterogeneous materials including a wide variety of different types of items. Accordingly, separation equipment for treating such urban wastes must be capable of coping with the extreme heterogeneity of waste material which is to be involved. Of particular interest from the point of view of the present invention are the problems which arise with regard to treating and separating waste materials which are chiefly composed of paper and plastic films.

A particular problem arising in the treatment of urban wastes occurs during the initial separation stage. At this stage of the separation process, the items included in the waste material must be separated according to their quality and size. Generally, known separation equipment operates on the basis of separating the individual items in the waste material in accordance with weight considerations. That is, lighter items are separated from heavier items within the treatment plants. However, items which operate on the basis of weight differentiation tend to be unsuitable when the urban wastes include a large amount of plastic film which must be separated from paper wastes. This is due to the fact that the specific weights and surface dimensions of these items are approximately the same and it becomes very difficult to distinguish one from the other.

Therefore in the art of urban waste treatment, when urban wastes must be subjected to an initial separation stage, it has heretofore been very difficult to suitably differentiate paper from plastic film and to effect and achieve adequate separation of these materials.

A further consideration in the art of treating waste materials involves the economics of the processes and apparatus utilized. Recovery of waste materials such as plastic films and paper can be of significant commercial value. However, until the present invention, it was not possible to adequately separate these materials with equipment which could be considered suitable from an economic standpoint. It must be understood that if the equipment which must be utilized to treat urban wastes tends to involve complexity or high costs, an economic barrier arises with regard to the practical utilization of such equipment. In the separation of plastic films and paper, it has previously been difficult or impossible to utilize pneumatic or mechanical means to effect the separation process. However, utilization of simple pneumatic or mechanical devices for such a purpose which are capable of operating without high expense can be of significant value in the area of urban waste reclamation.

Accordingly, the present invention is directed toward provision of separation equipment which is especially suitable for separating plastic films and paper in the treatment of urban solid wastes. The invention is directly aimed toward a structural arrangememt whereby such separation of plastic films and paper may occur with adequate effectiveness without introducing problems with regard to the complexities or expense of the apparatus which is utilized.

SUMMARY OF THE INVENTION

Briefly, the present invention mainly described as apparatus for treating waste materials composed chiefly of paper and plastic film comprising a casing which includes inner wall means defining a conduit through which the waste material is passed, conveyor means for delivering the waste material into the casing and reducer means essentially composed of a stellate rotor rotatably mounted within the casing and having rotary arms with ends engaging portions of the inner walls of the casing to effect cutting of paper and stretching of plastic film passed through the apparatus. The rotor is mounted to rotate about a fixed center of rotation and in a fixed direction. The arms of the rotor have a generally rigid configuration and the ends extend generally equidistantly from the center of rotation of the rotor. The equidistant location of the rotor ends is maintained by the rigid configuration of the arms. The ends of the arms are thereby caused to move along a generally circular path having a fixed radius during rotation of the rotor. The inner wall means of the casing includes a curved portion having a first end which is radially outwardly spaced from the circular path of the rotor ends and a second end located forwardly relative to the first end taken in the direction of rotor rotation. Thus, as the rotor rotates with its ends moving from the first end of the curved portion toward the second end, there is provided between the rotor ends and the curved portion a generally narrowing spacing through which the waste material must pass with the second end of the curved portion of the casing inner wall being arranged to generally coincide with the circular path of the rotor ends.

As a result, as the plastic films and paper become engaged between the curved portion of the casing inner wall and the ends of the rotor, the plastic film will tend to be stretched or smoothed into a generally elongated configuration while the paper particles will be cut. As a result of passage through the narrowing gap between the curved portion of the casing inner wall and the rotor ends, the ability to provide an effective differentiation and ultimate separation between paper and plastic film is afforded.

Accordingly, it will be clear that as a result of the specific structural configuration of the present invention, advantage may be taken of the differences in the characteristics of plastic films and paper whereby after passage about the stellate rotor of the invention, between the rotor ends and the casing wall curved portion, the plastic film and the paper will be transformed into configurations, due to the differences in the characteristics of these materials, which enhances and facilitates their further separation. Having subjected the plastic film and the paper to the aforesaid action of the reducer means of the invention, it then becomes a relatively simple matter to separate the paper from the plastic film through a convenient separation process.

After the waste materials have been passed through the portion of the casing within which the stellate rotor is mounted for rotation, the waste material is eventually conveyed through a pneumatic separator section of the apparatus where the subsequent separation stages may occur.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
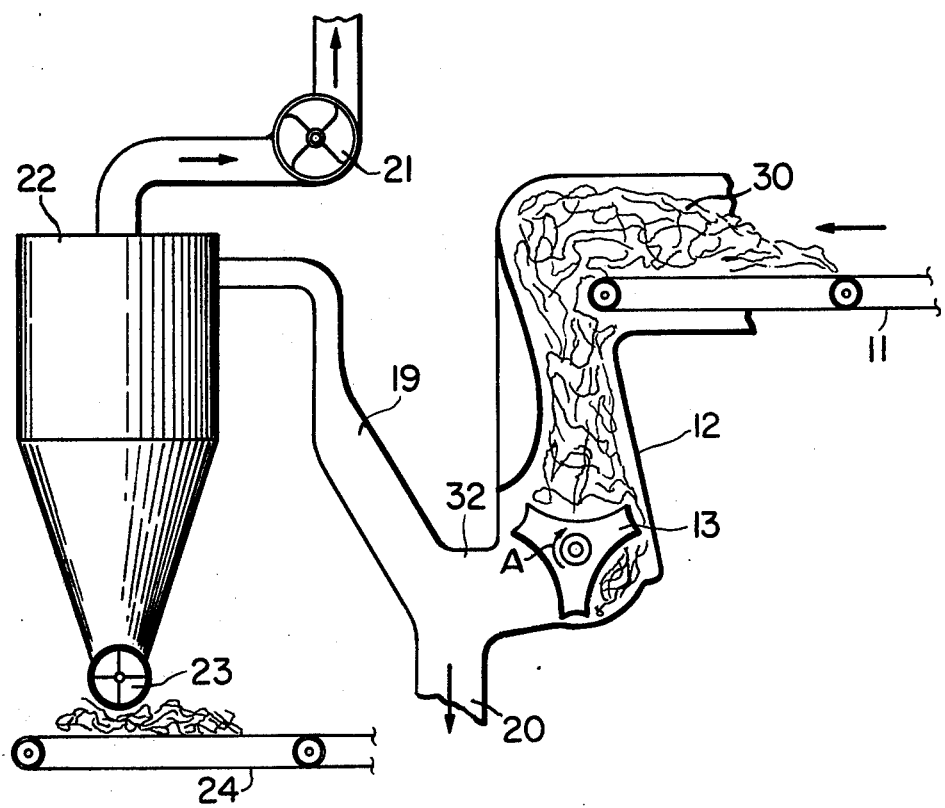
FIG. 1 is a schematic view of a plant for the separation of waste materials including therein the structure in accordance with the present invention.

As shown in the drawing, the present invention includes a conveyor 11 which operates to transport bulk urban solid waste material 30 into a casing 12 which essentially is configured as a vertically extending duct. The waste material 30 which is delivered from a plant or other location where such waste material may be accumulated, is composed chiefly, if not exclusively, of paper and plastic film. The conveyor 11 is a generally horizontally extending conveyor and as the waste material reaches the leftmost end thereof it is dropped by the force of gravity into the casing 12.

Located at a lower portion of the casing 12, there is a reducer means in the form of a stellate rotor 13 which is mounted for rotation in a direction A. As the stellate rotor 13 rotates, the waste material is caused to be cast between the inner walls of the casing 12 and the radially outer most ends of the rotor 13. The material thus engaged is then deposited within a chamber 32 which interconnects the outlet of the casing 12 with the inlet of further pneumatic separating equipment. After passing about the periphery of the rotor 13, gravity separation of the waste material occurs as the waste material passes through the chamber 32. Located to extend directly below the chamber 32 is a downwardly opening chute 20 and as the material passes through the chamber 32 the heavier more bulky material will be caused to drop into the chute 20 from the chamber 32.

An exhauster fan or blower 21 creates a suction effect within a chute 19 which extends upwardly from the chamber 32. Thus, lighter material which does not fall into the chute 20, is drawn upwardly by the blower 21 through the chute 19 into a separation hopper or decantation cyclone 22.

Material leaving the lowermost end of the hopper 22 is engaged by a rotary valve device 23 which deposits the material upon a conveyor 24. Of course, further separation of the deposited material may subsequently be effected.

The important aspects of the present invention relate to the specific structure of the stellate rotor 13 and the configuration of the inner walls of the casing 12. The portions emboding the specific principles of the present invention are shown in greater detail in FIG. 2.

Figure 2:
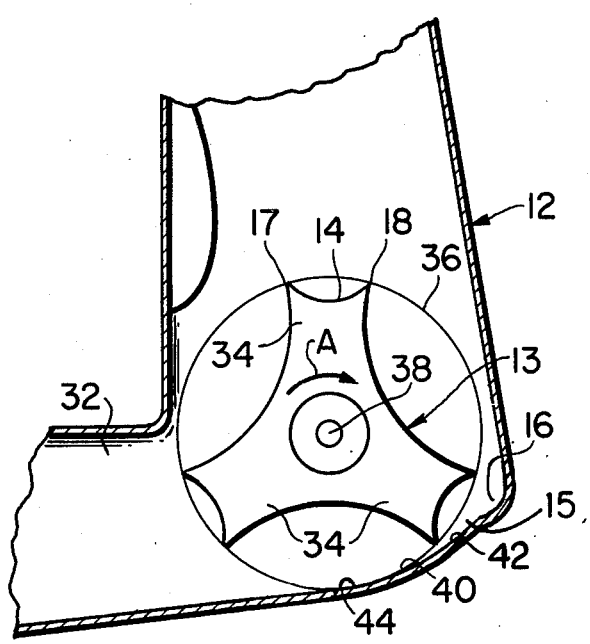
FIG. 2 is a more detailed elevational view of a portion of the apparatus of FIG. 1 showing more clearly the specific structural arrangement of the stellate rotor and the casing inner wall curved portion in accordance with the invention.

As seen in FIG. 2, the rotor 13 is caused to rotate in a fixed direction A. The rotor is composed of a plurality of rigid arms 34 each having ends 17 and 18. Because of the rigidity of the arms 34, the ends 17 and 18 of the rotor are caused to move about a circle labelled 36 which has a generally fixed radius extending from the center 38 about which the rotor rotates.

The casing 12 is formed with an inner wall shaped to define an accumulation gap 16 at the lower end of the casing 12. From the gap or pocket 16, the inner wall of the casing 12 is formed with a curved portion 40 which extends from a first end 42 thereof to a second end 44. It will be noted that the second end 44 of the curved portion 40 is located forwardly of the first end 42 taken relative to the direction A of rotor rotation.

The curved portion 40 is formed so that the first end 42 is spaced from the circle 36 in order to provide a gap or spacing 15 between the circle 36 and the first end 42. Thus, it will be seen that the first end 42 of the curved portion 40 is located radially outwardly from the circular path 36 within which the ends 17, 18 of the rotor 13 travel.

It will be noted that each arm 34 of the rotor 13 is formed with two ends 17, 18 with a concave portion 14 extending therebetween. Although this is a preferred embodiment of the invention in that it will operate to provide better results with certain types of material, it is to be understood that it is not necessary for the rotor 13 to be formed with this configuration. Indeed, the ends 17, 18 may be formed either with a pointed configuration or with a flat, blunt configuration and the arms 34 may or may not be formed with the concave portion 14. It is merely necessary that the outermost ends of the arms 34 be generally equidistant from the center 38 so that as the rotor 13 rotates, the ends of the rotor will first pass adjacent the first end 42 of the curved portion 40 where waste material will tend to accumulate, and then move along the curved portion 40 toward the second end 44 where a narrowing gap between the ends of the rotor and the curved portion 40 is formed. As the ends of the rotor move adjacent the second end 44 of the curved portion 40, the plastic film which has become engaged between the rotor ends and the curved portion 40 will tend to be drawn or stretched into a generally enlongated configuration and such plastic film will be emitted beyond the second end 44 and leftwardly thereof by the rotating rotor ends 17, 18. Paper which becomes engaged between the rotor ends and the curved portion 40 will tend to be cut up and will be emitted into smaller pieces and it will therefore be easier to subsequently separate the paper pieces from the plastic film.

It should be noted that the first end 42 of the curved portion 40 of the inner wall of the casing 12 may be formed with a radius of curvature which is larger than the radius of the circle 36. The second end 44 may be formed with a radius of curvature generally coinciding with the radius of the circle 36. Of course, it must be understood that the radius of curvature of the various portions of the curved portion 40 may vary within the specific limits of the invention, so long as the gap or spacing 15 is maintained at the point where the rotor ends 17, 18 first move adjacent the curved portion 40. So long as this gap or spacing is narrowed in the direction of rotor rotation so that as the rotor turns in the direction A the ends 17, 18 move closer to the inner wall of the casing 12 and into general conformity therewith at the second end 44, the proper operation of the invention will be maintained and effective differentiation of plastic film from paper will be achieved.

Thus, it will be seen that by virtue of the structure of the present invention, advantage may be taken of the different characteristics which exist between paper material and plastic film. The paper will tend to become cut up and the film will tend to become stretched and elongated by passage through the apparatus of the invention as the rotor 13 rotates. Material accumulated within the space 16 will tend to become lodged within the gap or spacing 15 and will then be engaged by the rotor in order to be drawn into the narrowing gap which exists between the ends of the rotor and the curved portion 40. By forming the rotor 13 with two cutting edges or ends 17, 18, the effect which is desired will be enhanced with regard to treatment of the paper and plastic film.

As the treated material moves into the subsequent elements of the pneumatic conveyor apparatus, heavier material will separate out into the chute 20 and the lighter material will be drawn upwardly into the chute 19. Of course, it should be understood that no separation of plastic film from paper need occur at this point and that other heavy materials which have also passed into the chamber 22 will be primarily separated out in this portion of the apparatus.

Of course, it will understood that the portion of the apparatus for actually effecting the separation between plastic and paper is not part of this invention and once the paper and plastic film has been treated by passage between the rotor 13 and the curved casing wall 40, any one of a variety of separating techniques may be used and the equipment shown in the drawing should therefore be considered as exemplary only.

From the foregoing it will be seen that many advantages may be derived from the present invention. Particularly, it will be seen that the effects which are sought to be achieved may be accomplished with equipment which is relatively simple in structure and inexpensive to construct and operate. The equipment permits advantage to be taken of the physical characteristics and features of the material to be processed and it allows the material to be easily and effectively separated. The apparatus involves only relatively few elements which may operate regularly and easily and which will require minimal maintenance. Few equipment breakdowns will occur and a variety of rotor configurations may be utilized depending upon types of materials which are to be treated and the overall effect which is sought.

While a specific embodiment of the invention has been shown and described in detail to illustrate the application of the inventive principles, it will be understood that the invention may be embodied otherwise without departing from such principles.

What is claimed is:

1. Apparatus for treating waste materials composed chiefly of paper and plastic film comprising: a casing including inner wall means defining a conduit through which said waste material is passed; conveyor means for delivering said waste material into said casing; reducer means essentially composed of a stellate rotor rotatably mounted within said casing and having rotary arms with ends engaging portions of said inner wall means of said casing to effect treatment of said waste materials; said rotor being mounted for rotation in a fixed direction about a fixed center of rotation with said arms being of a generally rigid configuration so that the ends thereof will be maintained generally equidistantly from said rotational center and will move through a generally circular path having a fixed radius while said rotor rotates; said casing inner wall means including a curved portion having a first and a second end, with said second end being located forwardly of said first end taken in the direction of rotor rotation, said first end being spaced radially outwardly from said circular path to form a gap between the ends of said rotor arms and said first end of said curved portion; and means defining an indented concave pocket located immediately upstream of said first end of said curved portion taken relative to the direction of waste material passage through said casing, said pocket being formed by portions of said inner wall means which are spaced radially outwardly from said circular path of said ends of said rotor arms a greater distance than said first end of said curved portion; said inner wall means being thereby formed to define an edge extending transversely of the direction of movement of the ends of said rotor arms and defining a demarcation between said concave pocket and said first end of said curved portion; with said curved portion being configured so that the spacing between said first end thereof and said ends of said rotor arms narrows toward said second end of said curved portion; said curved portion being formed with said second end generally conforming to the configuration of said circular path of said rotor and with a radius of curvature generally equivalent with the radius of said circular path; said first end of said curved portion being generally formed with a radius of curvature which is larger than the radius of said circular path of said ends of said rotor arms.

2. Apparatus according to claim 1 wherein said rotor arms each are formed with a pair of ends engaging said curved portion of said casing inner wall, and with a generally concave configuration extending between said pair of ends.

* * * * *